US008106868B2

(12) United States Patent
Chang et al.

(10) Patent No.: US 8,106,868 B2
(45) Date of Patent: Jan. 31, 2012

(54) PIXEL STRUCTURE AND DRIVING METHOD THEREOF

(75) Inventors: Shu-Yu Chang, Hsinchu County (TW); Wen-Hsiung Liu, Pingtung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 943 days.

(21) Appl. No.: 11/829,090

(22) Filed: Jul. 27, 2007

(65) Prior Publication Data

US 2008/0266229 A1 Oct. 30, 2008

(30) Foreign Application Priority Data

Apr. 30, 2007 (TW) ................................. 96115253 A

(51) Int. Cl.
*G09G 3/36* (2006.01)

(52) U.S. Cl. ................ 345/92; 345/87; 345/88; 345/89; 345/90; 345/91; 345/93; 345/94; 345/95; 345/96; 345/97; 345/98; 345/99; 345/100; 345/101; 345/102; 345/103; 345/104; 345/76; 345/82; 345/204

(58) Field of Classification Search ............ 345/87–104, 345/76, 82, 204
See application file for complete search history.

(56) References Cited

U.S. PATENT DOCUMENTS

| | | | | |
|---|---|---|---|---|
| 7,180,486 | B2 * | 2/2007 | Jeong ............................... | 345/82 |
| 7,777,698 | B2 * | 8/2010 | Takahara et al. ................. | 345/76 |
| 2004/0001167 | A1 | 1/2004 | Takeuchi et al. | |
| 2005/0134540 | A1 * | 6/2005 | Kim ................................ | 345/92 |
| 2007/0103405 | A1 * | 5/2007 | Kwak et al. ..................... | 345/76 |
| 2007/0229427 | A1 * | 10/2007 | Chen et al. ...................... | 345/92 |

FOREIGN PATENT DOCUMENTS

| | | |
|---|---|---|
| CN | 1573486 | 2/2005 |
| JP | 05-303114 | 11/1993 |
| JP | 10-096943 | 4/1998 |
| JP | 2003-322866 | 11/2003 |
| TW | I254813 | 5/2006 |

OTHER PUBLICATIONS

"1st Office Action of China counterpart application", issued on Apr. 3, 2009, p. 1-p. 4.
"Office Action of Taiwan Counterpart Application", issued on Jul. 27, 2011, p. 1-p. 5, in which the listed references were cited.

* cited by examiner

*Primary Examiner* — Richard Hjerpe
*Assistant Examiner* — Jeffrey Steinberg
(74) *Attorney, Agent, or Firm* — Jianq Chyun IP Office

(57) ABSTRACT

A pixel structure includes a first scan line, a second scan line, a third scan line, a data line, a first thin film transistor (TFT), a second TFT, a third TFT, a first pixel electrode and a second pixel electrode. Particularly, the second scan line and the third scan line are electrically connected with each other. The first TFT is electrically connected with the first scan line and the data line. The second TFT is electrically connected with the first TFT and the second scan line. Furthermore, the third TFT is electrically connected with the third scan line and the data line. In addition, the first pixel electrode and the second pixel electrode are respectively electrically connected with the second TFT and the third TFT.

7 Claims, 4 Drawing Sheets

PIXEL STRUCTURE AND DRIVING METHOD THEREOF

CROSS-REFERENCE TO RELATED APPLICATION

This application claims the priority benefit of Taiwan application serial no. 96115253, filed Apr. 30, 2007. All disclosure of the Taiwan application is incorporated herein by reference.

BACKGROUND OF THE INVENTION

1. Field of the Invention

The present invention relates to a display panel, and more particularly to a pixel structure of a liquid crystal display panel.

2. Description of Related Art

Currently, liquid crystal displays have been mostly developed towards high brightness, high contrast ratio, large display size and wide viewing angle. In order to increase the viewing angle of the LCDs, several wide-viewing-angle techniques have been proposed. The most popular LCDs with the wide-viewing-angle feature include, for example, multi-domain vertical alignment (MVA) LCDs, in-plane switching (IPS) LCDs, and fringe field switching (FFS) LCDs.

FIG. 1 is a top view of a conventional pixel structure applied to the MVA LCD. Referring to FIG. 1, a pixel structure 100 is disposed on a thin film transistor (TFT) array substrate, which includes a scan line 110, a data line 120, a TFT 130, a pixel electrode 140 and a plurality of protrusions 150. The TFT 130 includes a gate 132, a semiconductor layer 134, a source 136a, a drain 136b and a contact window 138. The gate 132 is electrically connected with the scan line 110, and the semiconductor layer 134 is disposed over the gate 132. The source 136a and the drain 136b are disposed on the semiconductor layer 134, and the source 136a is electrically connected with the data line 120.

The pixel electrode 140 is electrically connected with the drain 136b via the contact window 138. In addition, in order to arrange the liquid crystal molecules to arrange in an multi-domain vertically aligned manner, the protrusions 150 are disposed on the pixel electrode 140, and other protrusions (not shown) are disposed on an opposite color filter substrate (not shown). Therefore, with the protrusions 150 and the said other protrusions, the liquid crystal molecules disposed between the TFT array substrate and the color filter substrate tilt in multiple directions so as to achieve the effect of wide viewing angle.

The MVA LCD can increase the viewing angle. However, the light transmittance of the MVA LCD may vary corresponding to a gray-level gamma curve when the viewing angle is increased from 0 degree to 90 degrees. In brief, with viewing angles varied, image color tones and brightness distribution provided by the MVA LCD may be distorted to a greater extent.

SUMMARY OF THE INVENTION

In view of the above, the present invention is directed to a pixel structure used for alleviating the extent to which display quality varies with changing viewing angles.

The present invention is directed to a pixel structure, which includes a substrate, a first scan line, a second scan line, a third scan line, a data line, a first TFT, a second TFT, a third TFT, a first pixel electrode and a second pixel electrode. The first, second and third scan lines, the data line, the first, second and third TFTs, the first and second pixel electrodes are all disposed on the substrate. The second scan line is electrically connected with the third scan line, and the first TFT is electrically connected with the first scan line and the data line. In addition, the second TFT is electrically connected with the first TFT and the second scan line, while the third TFT is electrically connected with the third scan line and the data line. Furthermore, the first pixel electrode is electrically connected with the second TFT while the second pixel electrode is electrically connected with the third TFT.

According to an embodiment of the present invention, the first and second pixel electrodes are disposed between the second and third scan lines.

According to another embodiment of the present invention, the first TFT has a first drain while the second TFT has a second source, wherein the first drain is electrically connected with the second source.

According to still another embodiment of the present invention, the pixel structure further includes a common line disposed on the substrate, wherein the first pixel electrode and the second electrode respectively overlap a portion of the common line.

According to yet another embodiment of the present invention, the pixel structure further includes a plurality of alignment members disposed on the first and second pixel electrodes, wherein the said alignment members include alignment protrusions or alignment slits.

The present invention is directed to a driving method for a pixel structure, which is suitable for driving the aforementioned pixel structure. The driving method for the pixel structure includes steps which will be described as follows. Initially, the first, second and third TFTs are turned on via the first, second and third scan lines. Then, a first data voltage is inputted to the first and second pixel electrodes through the data line, respectively. After that, the first TFT is turned off via the first scan lines while the second and third TFTs are turned on via the second and third scan lines. Finally, a second data voltage is inputted to the second pixel electrode via the data line, wherein the first data voltage is different from the second data voltage.

Based on the above, two pixel electrodes can respectively reach different voltage levels based on the driving method adopted by the pixel structure of the present invention so that the liquid crystal molecules disposed on the two pixel electrodes can tilt in different angles. Therefore, the extent to which the light transmittance of an MVA LCD, which an embodiment of the present invention is applied to, varies with a gray-level gamma curve may be alleviated.

In order to the make the aforementioned and other objects, features and advantages of the present invention comprehensible, several embodiments accompanied with figures are described in detail below.

DESCRIPTION OF EMBODIMENTS

Figure 1:
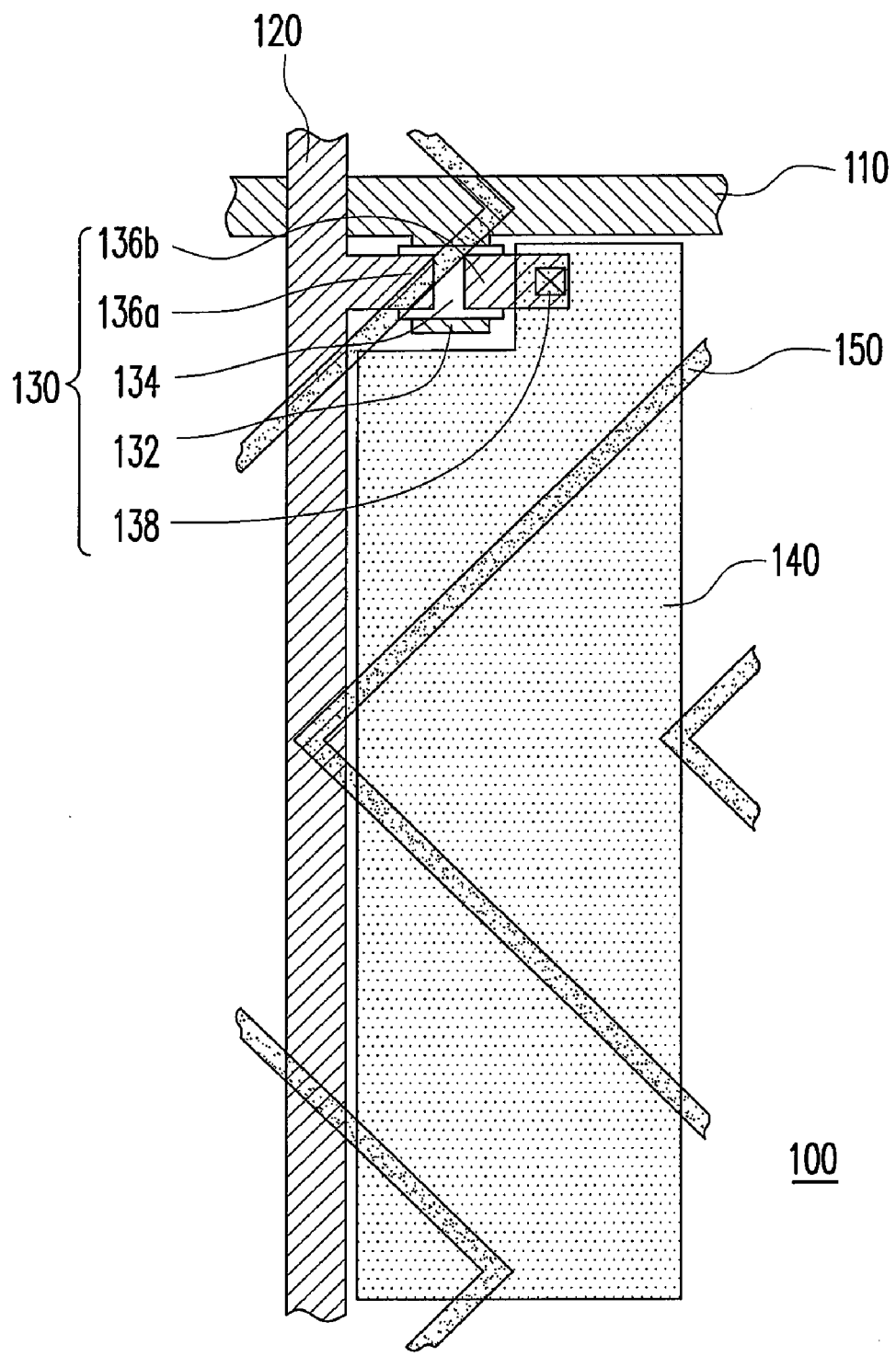
FIG. 1 is a top view of a conventional pixel structure applied to a multi-domain vertical alignment liquid crystal display (MVA LCD).
Figure 2:
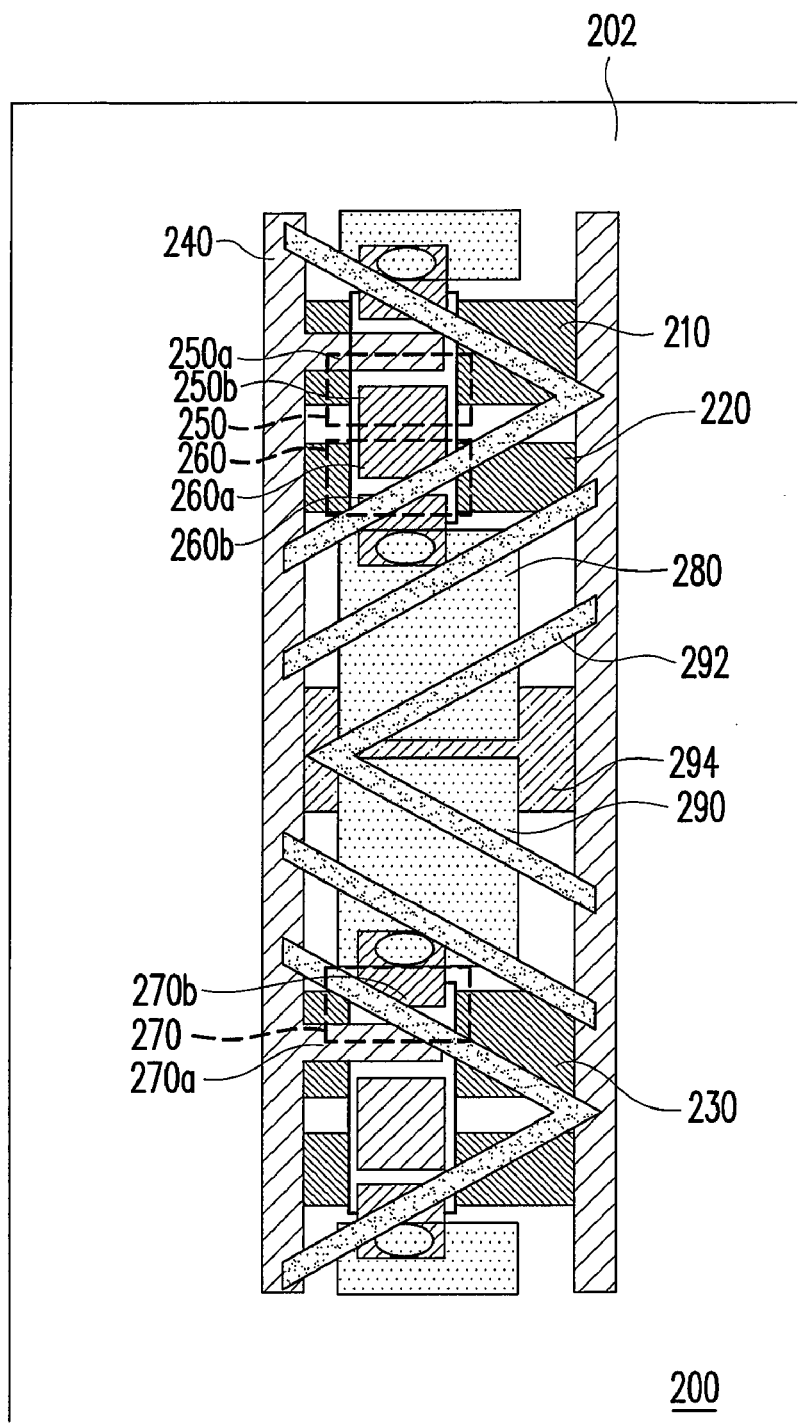
FIG. 2 is a top view of a pixel structure according to an embodiment of the present invention.

FIG. 2 is a top view of a pixel structure according to an embodiment of the present invention. Referring to FIG. 2, a pixel structure 200 includes a substrate 202, a first scan line 210, a second scan line 220, a third scan line 230, a data line 240, a first thin film transistor (TFT) 250, a second TFT 260, a third TFT 270, a first pixel electrode 280 and a second pixel electrode 290. The first scan line 210, the second scan line 220, the third scan line 230, the data line 240, the first TFT 250, the second TFT 260, the third TFT 270, the first pixel electrode 280 and the second pixel electrode 290 are all disposed on the substrate 202. It should be noted that the second scan line 220 is electrically connected with the third scan line 230.

Particularly, the first TFT 250 is electrically connected with the first scan line 210 and the data line 240, while the second TFT 260 is electrically connected with the first TFT 250 and the second scan line 220. In addition, the third TFT 270 is electrically connected with the third scan line 230 and the data line 240. The first pixel electrode 280 is electrically connected with the second TFT 260, while the second pixel electrode 290 is electrically connected with the third TFT 270. Moreover, it should be noted that the pixel structure 200 may further include a plurality of alignment members 292 disposed on the first pixel electrode 280 and the second pixel electrode 290 when the pixel structure 200 is arranged in a multi-domain vertical alignment (MVA), as shown in FIG. 2. However, the plurality of alignment members 292 may not be included therein when the pixel structure 200 is a twisted-nematic (TN) mode. The present invention is not intended to set a limit to the plurality of alignment members 292. In the present embodiment, the alignment members 292 may be slits, while the alignment members 292 may be protrusions in another embodiment.

In the aforementioned pixel structure 200, the first pixel electrode 280 and the second pixel electrode 290 are disposed between the second scan line 220 and the third scan line 230. In more detail, the first TFT 250 has a first source 250a and a first drain 250b, while the second TFT 260 has a second source 260a and a second drain 260b, wherein the first drain 250b is electrically connected with the second source 260a. The third TFT 270 has a third source 270a and a third drain 270b. The first drain 250b and the second source 260a disclosed in the present embodiment are the same layer of metal. However, the present invention is not intended to limit the first drain 250b and the second source 260a to be formed together. In other embodiments, the first drain 250b and the second source 260a can alternatively be separate from each other. Moreover, the present invention is not intended to limit the modes and types of the first TFT 250, the second TFT 260 and the third TFT 270 to those disclosed in FIG. 2. For example, the first TFT 250, the second TFT 260 and the third TFT 270 can alternatively be separate from each other.

In addition, in the aforementioned pixel structure 200, the first pixel electrode 280 and the second pixel electrode 290 respectively overlap a portion of the common line 294. There is storage capacitance generated between a potion of the common line 294 and the first pixel electrode 280, as well as between a portion of the common line 294 and the second pixel electrode 290. In other words, the structure of the storage capacitance disclosed in the present invention is capacitance formed on the common line (Cst on common). However, the present invention is not intended to limit the structure of the storage capacitance to Cst on common. In other embodiments, the structure of the storage capacitance can alternatively be capacitance formed on the scan line (Cst on gate).

Figure 3:
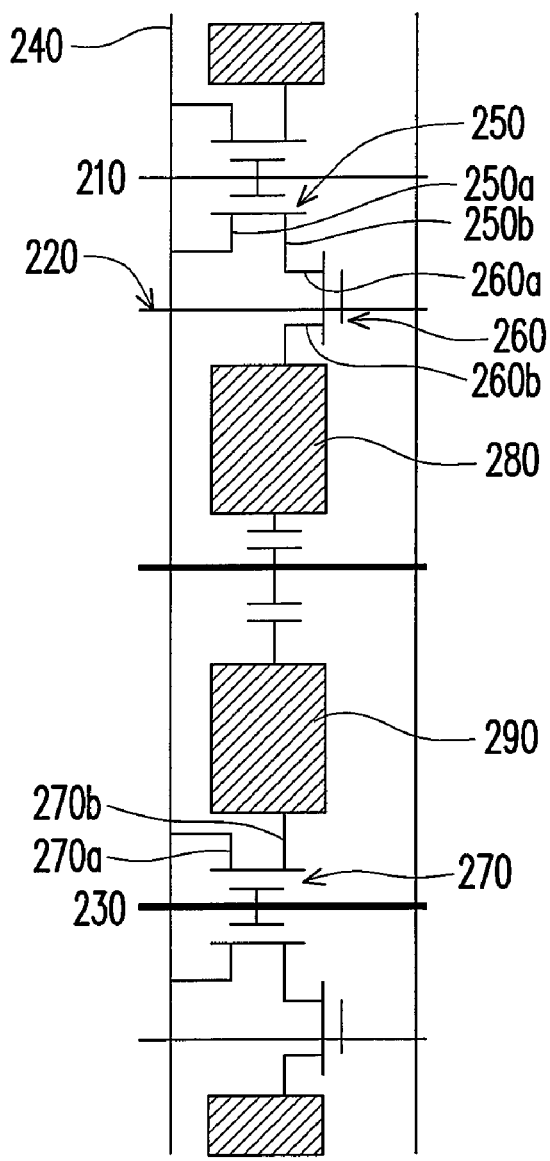
FIG. 3 is an equivalent circuit diagram of the pixel structure illustrated in FIG. 2.

FIG. 3 is an equivalent circuit diagram of the pixel structure illustrated in FIG. 2. Referring to FIG. 2 together with FIG. 3, the driving method for the pixel structure 200 includes the following steps. Initially, at a first time, a signal may be inputted into the first scan line 210, the second scan line 220 and the third scan line 230 to turn on the first TFT 250, the second TFT 260 and the third TFT 270. In the meantime, a first data voltage is inputted to the first pixel electrode 280 and the second pixel electrode 290 via the data line 240 respectively. After that, at a second time, the first TFT 250 is turned off via the first scan line 210 while the second TFT 260 and the third TFT 270 are turned on via the second scan line 220 and the third scan line 230. In the meantime, a second data voltage is inputted to the second pixel electrode 290 via the data line 240, wherein the first data voltage is different from the second data voltage.

Based upon the driving method described above, at the first time of driving, the first data voltage of the data line 240 is inputted to the first pixel electrode 280 and the second pixel electrode 290. Then at the second time of driving, since the first TFT 250 is turned off via the first scan line 210, the second data voltage of the data line 240 can not be inputted to the first pixel electrode 280 and the first data voltage inputted at the first time is retained in the first pixel electrode 280. At the same time, the second data voltage of the data line 240 is inputted to the second pixel electrode 290. Briefly speaking, at the said first time, the first pixel electrode 280 and the second pixel electrode 290 have the identical first data voltage. However, at the said second time, the first data voltage inputted at the first time is retained in the first pixel electrode 280, and the second pixel electrode 290 has the second data voltage. Therefore, the first pixel electrode 280 and the second pixel electrode 290 of the pixel structure 200 can reach different voltage levels based on such driving method to result the liquid crystal molecules disposed on the two pixel electrodes in tilting in different angles so that the extent of how the light transmittance of an MVA LCD varies with a gray-level gamma curve can be alleviated. The driving method for the pixel structure will be described by an equivalent circuit diagram together with a driving waveform diagram hereinafter.

Figure 4:
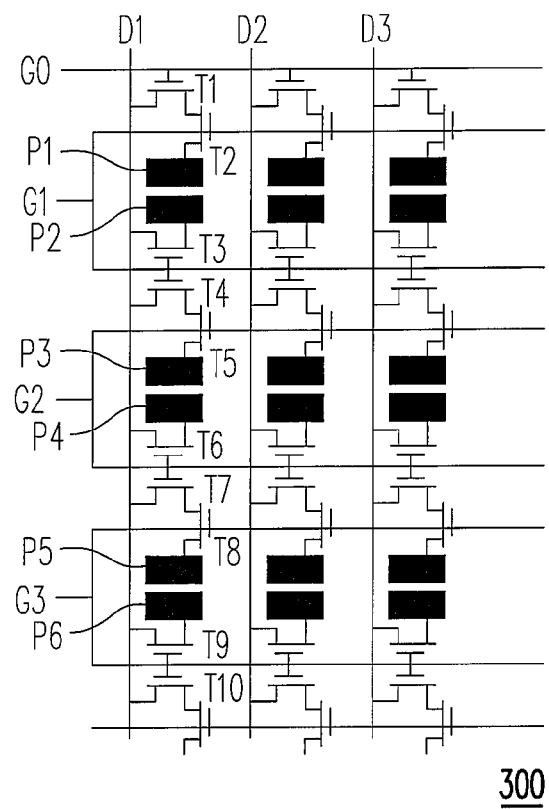
FIG. 4 is an equivalent circuit diagram adopting the thin film transistor (TFT) array substrate of the pixel structure illustrated in FIG. 2.

FIG. 4 is an equivalent circuit diagram of the TFT array substrate of the pixel structure illustrated in FIG. 2. Referring to FIG. 4, a TFT array substrate 300 includes a plurality of scan lines, such as G0, G1, G2 and G3, a plurality of data lines, such as D1, D2 and D3, a plurality of TFTs, such as T1, T2, T3, T4, T5, T6, T7, T8, T9 and T10, as well as a plurality of pixel electrodes, such as P1, P2, P3, P4, P5 and P6.

Figure 5:
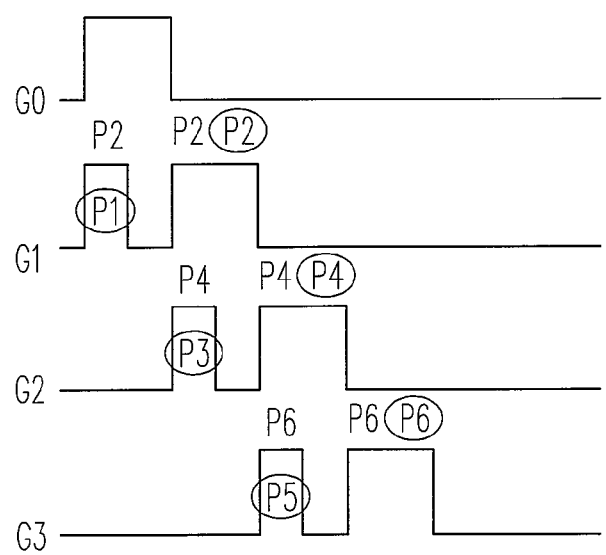
FIG. 5 is a diagram showing the waveform of driving the TFT array substrate illustrated in FIG. 4.

FIG. 5 is a diagram showing the waveform of driving the TFT array substrate illustrated in FIG. 4. Referring to both FIG. 4 and FIG. 5, the driving method for such TFT array substrate 300 includes steps which will be described as below. At a first time, a signal is inputted to the scan lines G0 and G1 to turn on the TFTs T1, T2 and T3, and meanwhile, the first data voltage V1 is inputted to the pixel electrodes P1 and P2 via the data line D1. At a second time, a signal of the scan line G0 is disabled, and signals of the scan lines G1 and G2 are enabled. Then the TFT T1 is turned off via the signal of scan line G0 while the TFTs T2, T3, T4, T5, T6 and T7 are turned on via the signals of the scan lines G1 and G2. In the meantime, a second data voltage V2 is inputted to the pixel electrodes P2, P3 and P4 via the data line D1. At a third time, a signal of the scan line G2 is disabled and the signal of the scan line G1 stay enabled. Then the TFTs T2 and T3 are turned on via the signal of the scan line G1. Meanwhile, the third data V3 voltage is inputted to the pixel electrode P2 via the data line D1.

Following the previous step, at a forth time, a signal of the scan line G1 is disabled, and signals of both the scan lines G2 and G3 are enabled. Then the TFTs T5-T6-T7-T8-T9 and T10 are turned on via the scan lines G2 and G3, at the same time, a fourth data voltage V4 is inputted to the pixel electrodes P4, P5 and P6 via the data line D1. At a fifth time, a signal of the scan line G3 is disabled while the signal of the scan line G2 stay enabled simultaneously. Then the TFTs T5 and T6 are turned on via the signal of scan line G2. Meanwhile, a fifth data voltage V5 is inputted to the pixel electrode P4 via the data line D1. The present invention has been described according to an embodiment with reference to the pixel array 300 illustrated in FIG. 4. However, the present invention is not intended to set a limit to the number of pixel structures and the alignment method thereof.

Based on the foregoing, adjacent pixels in the LCD panel can respectively reach different voltage levels when the above-mentioned driving method is utilized by the pixel array formed by the pixel structure units of the present invention. In other words, the present invention can render the liquid crystal molecules on the pixel electrodes in the LCD panel in tilted in different angels so that the extent to which the light transmittance of an MVA LCD varies with a gray-level gamma curve may be alleviated accordingly.

Although the present invention has been disclosed above by the embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A pixel structure, having three thin film transistors (TFTs), the pixel structure comprising:
   a substrate;
   a first scan line disposed on the substrate;
   a second scan line disposed on the substrate;
   a third scan line disposed on the substrate, wherein the second scan line is electrically connected with the third scan line;
   a data line disposed on the substrate;
   a first TFT disposed on the substrate, which is electrically connected with the first scan line and the data line;
   a second TFT disposed on the substrate, which is electrically connected with the first TFT and the second scan line, and the second TFT is electrically connected to the data line through the first TFT;
   a third TFT disposed on the substrate, which is electrically connected with the third scan line and the data line;
   a first pixel electrode disposed on the substrate, which is electrically connected to the data line through the first TFT and the second TFT; and
   a second pixel electrode disposed on the substrate, which is electrically connected with the third TFT, wherein gates of the first TFT, the second TFT, and the third TFT are directly connected to the first scan line, the second line, and the third scan line, respectively.

2. The pixel structure as claimed in claim 1, wherein the first pixel electrode and the second pixel electrode are disposed between the second scan line and the third scan line.

3. The pixel structure as claimed in claim 1, wherein the first TFT has a first drain, and the second TFT has a second source, and the first drain is electrically connected with the second source.

4. The pixel structure as claimed in claim 1, further comprising a common line disposed on the substrate, wherein the first pixel electrode and the second pixel electrode respectively overlap a portion of the common line.

5. The pixel structure as claimed in claim 1, further comprising a plurality of alignment members disposed on the first pixel electrode and the second pixel electrode.

6. The pixel structure as claimed in claim 5, wherein the alignment members comprise alignment protrusions or alignment slits.

7. A driving method for a pixel structure suitable for driving the pixel structure as claimed in claim 1, the driving method of the pixel structure comprising:
   turning on the first TFT, the second TFT and the third TFT via the first scan line, the second scan line and the third scan line;
   inputting a first data voltage to the first pixel electrode and the second pixel electrode respectively via the data line;
   turning off the first TFT via the first scan line and turning on the second and third TFTs via the second scan line and third scan line; and
   inputting a second data voltage to the second pixel electrode via the data line, wherein the first data voltage is different from the second data voltage.

* * * * *